(12) United States Patent
Chen et al.

(10) Patent No.: US 7,701,342 B2
(45) Date of Patent: Apr. 20, 2010

(54) NAVIGATION SYSTEM USING RFID TAGS AND METHOD

(75) Inventors: Jian-Ren Chen, Hsinchu Hsien (TW); Leii H. Chang, Hsinchu Hsien (TW); Hon-Yue Chou, Hsinchu Hsien (TW); Yi-Fei Luo, Hsinchu Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 561 days.

(21) Appl. No.: 11/583,925

(22) Filed: Oct. 20, 2006

(65) Prior Publication Data

US 2007/0146136 A1 Jun. 28, 2007

(30) Foreign Application Priority Data

Dec. 27, 2005 (TW) .................... 94146640 A

(51) Int. Cl.
G08B 13/14 (2006.01)
G08G 1/095 (2006.01)
H04Q 1/30 (2006.01)
G01C 21/00 (2006.01)
G01C 21/30 (2006.01)

(52) U.S. Cl. .............. 340/572.1; 340/572.8; 340/944; 340/539.1; 701/200; 701/207; 701/209; 701/211; 701/212

(58) Field of Classification Search ............ 340/572.1, 340/944, 539, 825.19; 342/465, 463; 701/200, 701/207, 211, 208, 213; 404/19, 995
See application file for complete search history.

(56) References Cited

U.S. PATENT DOCUMENTS

| | | | |
|---|---|---|---|
| 6,771,189 B2 * | 8/2004 | Yokota | 340/990 |
| 7,212,126 B2 * | 5/2007 | Hachiga | 340/572.8 |
| 7,239,963 B2 * | 7/2007 | Suzuki | 701/211 |
| 7,430,473 B2 * | 9/2008 | Foo et al. | 701/212 |
| 2003/0014186 A1 * | 1/2003 | Adams et al. | 701/207 |
| 2005/0104747 A1 * | 5/2005 | Silic et al. | 340/944 |
| 2005/0134440 A1 * | 6/2005 | Breed | 340/435 |
| 2006/0129308 A1 * | 6/2006 | Kates | 701/200 |
| 2006/0208888 A1 * | 9/2006 | Patel et al. | 340/572.1 |
| 2006/0230037 A1 * | 10/2006 | Sugiyama et al. | 707/6 |
| 2006/0271274 A1 * | 11/2006 | Saarikivi | 701/200 |

* cited by examiner

*Primary Examiner*—Daniel Wu
*Assistant Examiner*—Fekadeselassie Girma
(74) *Attorney, Agent, or Firm*—Birch, Stewart, Kolasch & Birch, LLP

(57) ABSTRACT

A navigation system and method are applied in a predetermined space in which a plurality of control points is defined. The navigation method comprises the steps of: installing a plurality of control point RFID tags near the entrance to every control point-controlled lane, wherein each control point RFID tag is stored with data thereof; reading the data stored in the RFID tags; determining, in light of the read data, a direction or a distance one should preferably go from a current location; and indicating the determined direction or the determined distance, using an indicating device.

18 Claims, 3 Drawing Sheets

NAVIGATION SYSTEM USING RFID TAGS AND METHOD

BACKGROUND OF THE INVENTION

1. Field of the Invention

The present invention relates to navigation systems, and more particularly, to a navigation system and method implemented by radio frequency identification (RFID) technology.

2. Description of the Prior Art

Visitors who have parking spaces reserved may fail to find their reserved parking spaces just because they get lost in the parking lots while taking complicated routes therein. Drivers leaving large parking lots manage to find toll collection booths after taking routes longer than what is required, though the drivers may even miss exits and thereby waste their time. Looking for things to buy in large shopping malls with complicated routes is the most annoying shopping experience, which is especially true where, in the shopping malls, walkways are not straight and routes are not invariable, not to mention that walkway layouts vary from floor to floor, making it difficult for shoppers to locate their target merchandise. Once a movie or performance starts, latecomers will have to grope their way in the dark. The aforesaid situations are always embarrassing. It is much easier to go to a target location, using a device that advises users at crossroads which way to go and indicates the distance and the direction the users should preferably go before reaching the target location.

Over recent years, use of global positioning systems (GPS) is no longer restricted to the military, but is becoming more civilian-oriented, involving international airlines, maritime services and rescue operations; global positioning systems are widely used in terrestrial navigation systems, and vehicular navigation systems especially. In general, a vehicular navigation system entails using a GPS module installed in a vehicle to display route maps, for example, the best driving route and the shortest driving route, on a display panel in accordance with inbuilt maps, immediately after data about a current location and an intended destination are entered into an operating panel. Once a driver strays from a course indicated in a route map displayed on the display panel, the driver will have to reenter the data about the current location and the intended destination in order to allow the GPS module to work out the recommended driving route anew. Of course, it is dangerous to reenter data while driving. Similarly, it is a waste of time stopping a vehicle in order to reenter data, and it is inconvenient to do so especially when the traffic is too heavy to allow the driver to stop the vehicle for even a short while. Furthermore, considering the preciseness of GPS observation nowadays, GPS are best used in large spaces, for example, national highways, provincial highways, county routes, and roads. By contrast, it is infeasible to use GPS in small predetermined spaces (for example, parking lots), because small geographic spaces require relatively precise GPS data. But GPS which are relatively more precise are relatively expensive. Hence, GPS are presently not used in small spaces.

Radio frequency identification (RFID) is a kind of identification technology that rests on an embedded chip, tag, transceiver, and backend system middleware. With a chip emitting radio waves, RFID allows a network to gain access to related data such that objects are identified, tracked down and managed. RFID involves using radio waves for transmitting any identification data required for identification. A RFID system comprises three major components, namely an antenna, transponder (or tag), and transceiver (or reader). A transponder, also known as a tag, comprises a tiny chip and an antenna. A battery-powered transponder is generally referred to as an active tag. An active tag is characterized by a large memory and long read distance, though the active tag has its own drawbacks, namely high prices, and a mere 7 to 10 years of battery life. A transponder is generally referred to as a passive tag when powered by inductive coupling. A passive tag has a small memory, and its advantages are, namely competitive pricing and having a unique identification code. The primary purpose of a transceiver is to receive instructions from a host computer and send back data stored in the transponder to the host computer in a wired (for example, by RS422 or Ethernet) or wireless manner. A transceiver comprises a controller and an antenna. A transceiver for long distance read is typically equipped with an individually installed antenna. The aforesaid controller and antenna are not hereinafter described in details, as they are familiar to persons ordinarily skilled in the art.

SUMMARY OF THE INVENTION

In light of the aforesaid drawbacks of the prior art, it is a primary objective of the present invention to provide a navigation system and method whereby an indicating device in a predetermined space indicates a direction or a distance one should preferably go in order to reach a target location. Even if one fails to proceed to an intended destination in a direction recommended by the navigation system, at the next crossroads or fork junction the navigation system will recommend a direction again. Where a plurality of users are concurrently using the navigation system of the present invention, interference or a user's mis-read of another user's RFID tag rarely occurs, because each RFID tag has its own unique identification code.

In order to achieve the above objectives, the present invention provides a navigation system and method. The navigation system for use in a predetermined space in which a plurality of control points is defined comprises a plurality of control point RFID tags, a RFID reader, a processor, and an indicating device. As regards the plurality of control point RFID tags, a control point RFID tag is stored with data thereof and is disposed near the entrance to every control point-controlled lane. The RFID reader reads the data stored in the RFID tag. The processor is capable of judging the moving direction or distance in accordance with the information of target location and the information currently read by the RFID reader and stored in the control point RFID tags. The indicating device indicates the direction or the distance determined by the processor. The control point is one selected from the group consisting of an exit, entrance, crossroads, fork junction, the end of a lane, and a turn.

The navigation method of the present invention is applied in a predetermined space in which a plurality of control points is defined. The navigation method comprises the steps of: installing a plurality of control point RFID tags near the entrance to every control point-controlled lane, wherein each control point RFID tag is stored with data thereof; reading the data stored in the RFID tags; determining, in light of the read data, a direction or a distance one should preferably go from a current location; and indicating the determined direction or the determined distance, using an indicating device.

With the navigation system and method of the present invention, it is feasible to indicate, by an indicating device and in a predetermined space, a direction or a distance one should preferably go in order to reach a target location, using simple, easy-to-comprehend, direction-indicating arrows and symbols, or direction-indicating voice instructions, rather than any complicated display equipment, so as to minimize visual interference and reduce the time taken to perform an identification operation. Even if one fails to proceed in a direction recommended by the navigation system, at the next crossroads or fork junction the navigation system will recommend a direction again, lessening the likelihood that traffic accidents may happen to drivers who miss GSP-recommended junctions and thereby get nervous. Where a plurality of users are using the navigation system of the present invention concurrently, interference or a user's mis-read of another user's RFID tag rarely occurs, because each RFID tag has its own unique identification code.

BRIEF DESCRIPTION OF THE DRAWINGS

A better understanding of the present invention can be obtained when the forgoing detailed description is considered in conjunction with the following drawings, in which.

DETAILED DESCRIPTION OF THE PREFERRED EMBODIMENTS

The following specific embodiments are provided to illustrate the present invention. Others skilled in the art can readily gain an insight into other advantages and features of the present invention based on the contents disclosed in this specification. The present invention can also be performed or applied in accordance with other different embodiments. Various modifications and changes based on different viewpoints and applications yet still within the scope of the present invention can be made in the details of the specification.

Figure 1:
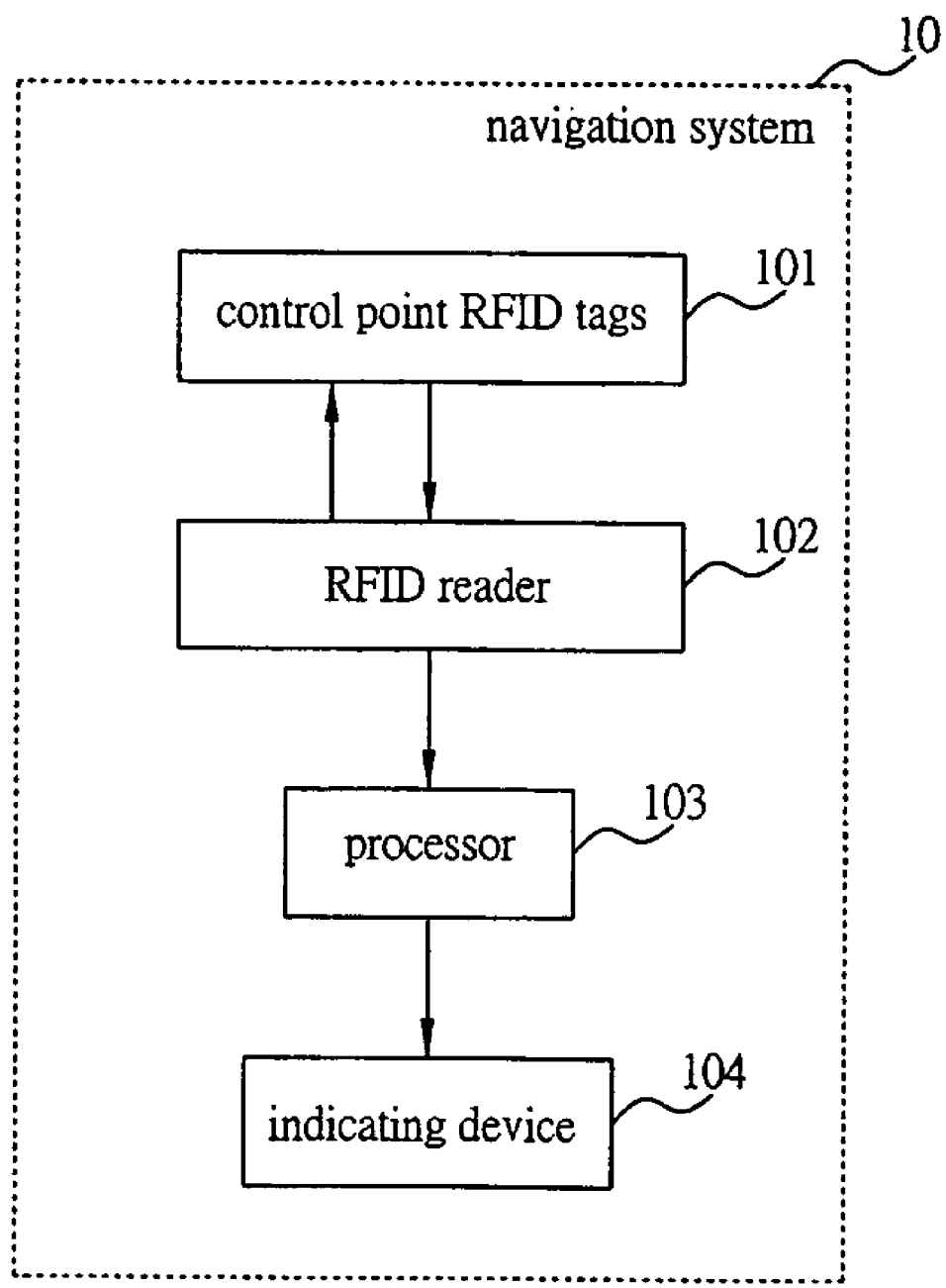
FIG. 1 is a schematic block diagram showing a navigation system according to an embodiment of the present invention.

FIG. 1 is a functional block diagram showing a navigation system 10 according to an embodiment of the present invention. The navigation system 10 comprises control point RFID tags 101, a RFID reader 102, a processor 103, and an indicating device 104. The control point RFID tags 101 are disposed near the entrance to every control point-controlled lane (to be explained later), each stored with data thereof. To be specific, the data stored in the control point RFID tags 101 comprise titles of the control points and orientation of the control point RFID tags 101 in relation to the control points.

Data about a target location comprises the data regarding directions or distances to the target location from control point-controlled lanes within a predetermined space in which the control RFID tags 101 are installed. The data about the target location are stored in a target location RFID tag before being read and sent to the processor 103 by the RFID reader 102 for follow-up processing. The target location RFID tag may be disposed in articles, such as parking permits, discount coupons, tickets, outpatient registration cards, student IDs, public transport tickets, verification IDs, credit cards, and ID cards, so as to provide access to data related to the target location.

In another embodiment, data related to the target location are sent to the processor 103 by a source management system in the predetermined space via a wireless network. The predetermined space refers to a limited space selected from the group consisting of a parking lot, shopping mall, performance venue, exhibition venue, theater, hospital, school, station, plant, commercial building. Examples of the source management system of the predetermined space refers are, namely a parking lot management system, shopping mall management system, performance venue management system, exhibition venue management system, theatrical management system, hospital management system, school management system, station management system, plant management system, and commercial building management system.

The RFID reader 102 uses radio waves for reading the data stored in the control point RFID tags 101 and the target location RFID tag.

The processor 103 can be a processor that belongs to one selected from the group consisting of a PDA, notebook computer, panel computer, cell phone, and vehicular computer. The processor 103 determines a direction or a distance one should preferably go from the current location in light of the data about the target location as well as the data stored in the control point RFID tags 101 and currently read by the RFID reader 102.

The indicating device 104 indicates a direction or a distance determined by the processor 103. The indicating device 104 can be a displayer coupled to the processor 103. In another embodiment, the displayer is a vehicular head-up display, and displayed on the displayer are arrows indicating the directions determined by the processor. In another embodiment, the indicating device 104 can be a sound player coupled to the processor 103 and configured to play sounds indicating the directions or the distances determined by the processor 103.

Figure 2:
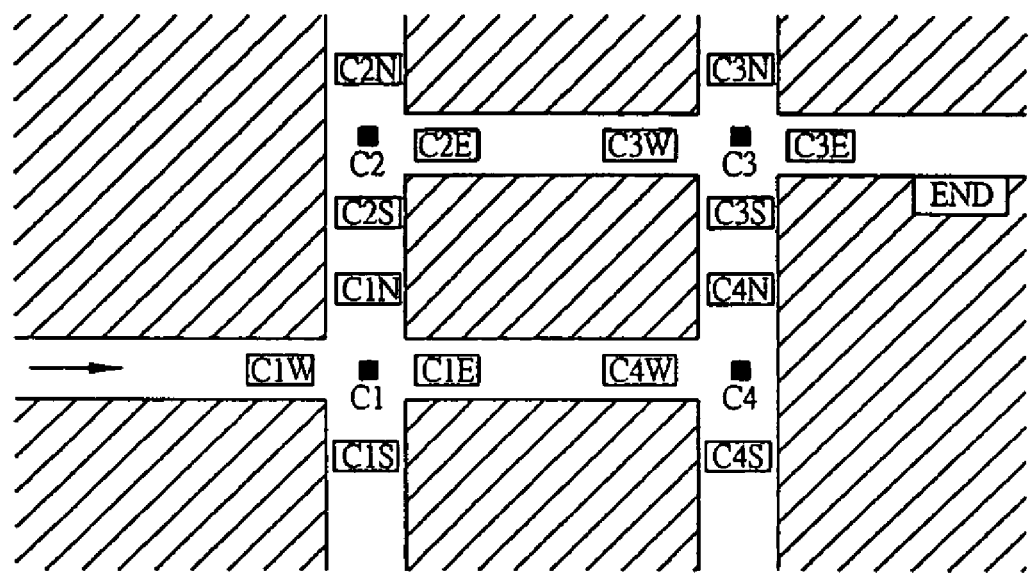
FIG. 2 is a schematic view showing where to place RFID tags of a navigation system according to an embodiment of the present invention.

FIG. 2 is a schematic view showing where to place RFID tags of a navigation system according to an embodiment of the present invention. Control points C1, C2, C3 and C4 can be exits, entrances, crossroads, fork junctions, ends of lanes, and turns. In an embodiment, control point RFID tags C1E, C1W, C1S, C1N, C2E, C2S, C2N, C3E, C3W, C3S, C3N, C4W, C4S, and C4N, may be disposed near the entrance to every control point-controlled lane. For instance, the control point C1 is located at crossroads, and the control point C1 is accessible in four directions (north, south, east, west), thus the control point RFID tag C1E is disposed at the entrance to the eastern lane near the control point C1, the control point RFID tag C1W at the entrance to the western lane near the control point C1, the control point RFID tag C1S at the entrance to the southern lane near the control point C1, and the control point RFID tag C1N at the entrance to the northern lane near the control point C1. The control point RFID tags are disposed in the other control points C2, C3 and C4 in the aforesaid manner and stored with titles of the control points and orientation of the control point RFID tags in relation to the control points. Location-related data about the target location END are stored in the target location RFID tags and read by the RFID reader or sent to the processor by the source management system in the predetermined space via the wireless network.

The predetermined space described in the embodiment below is a parking lot. Once a vehicle reaches the entrance to the parking lot, a parking lot management system will store location-related data about an unoccupied parking space (for example, the target location END) in the target location RFID tag and affix the target location RFID tag to a parking coupon. The location-related data are shown in the table below.

| Control Point | Forward Direction | Distance | On the Left or Right | Height |
|---|---|---|---|---|
| C1 | North | | | |
| C2 | East | | | |
| C3 | East | 5 meters | On the Right | Level 1 |
| C4 | North | | | |

The above table shows the following data: where the RFID reader 102 reads any RFID tag related to the control point C1 (namely C1E, C1W, C1S and C1N), the forward direction is "north"; where the RFID reader 102 reads any RFID tag related to the control point C2 (namely C2E, C2S and C2N), the forward direction is "east"; where the RFID reader 102 reads any RFID tag related to the control point C3 (namely C3E, C3W, C3S and C3N), the forward direction is "east", the distance is "5 meters", the target location is "one the right", and the height is "level 1"; and where the RFID reader 102 reads any RFID tag related to the control point C4 (namely C4W, C4S and C4N), the forward direction is "north".

The table below is about directions indicated at the control points.

| | To | | | |
|---|---|---|---|---|
| From | East | West | South | North |
| East | U-Turn | Go Straight On | Turn Left | Turn Right |
| West | Go Straight On | U-Turn | Turn Right | Turn Left |
| South | Turn Right | Turn Left | U-Turn | Go Straight On |
| North | Turn Left | Turn Right | Go Straight On | U-Turn |

The above table provides the following data: where one comes from the east and is east bound, the indicated direction is "U-Turn"; where one comes from the east and is west bound, the indicated direction is "Go Straight On"; where one comes from the east and is south bound, the indicated direction is "Turn Left"; where one comes from the east and is north bound, the indicated direction is "Turn Right"; and the other orientations are inferred by analogy.

Once the driver obtains a parking coupon, the RFID reader 102 will read the location-related data about the unoccupied parking space, or the location-related data about the unoccupied parking space may be downloaded from the parking lot management system through the wireless network, using the driver's PDA. Once the vehicle enters the parking lot from the west of the control point C1 and reaches a location where the control point RFID tag C1W is readable, the RFID reader 102 will read the data about the control point RFID tag C1W and send the read data to the processor 103. Then, the processor 103 determines that the forward direction should be the "north" in light of the data about the control point RFID tag C1W and the location-related data about the unoccupied parking space, and displays the indicated direction (for example, "Turn Left") on a vehicular head-up display. In the event that the driver misses the time to turn left and go straight on for some reason, the RFID reader 102 will read the data about the control point RFID tag C4W and send the read data to the processor 103 when the vehicle reaches a location where the control point RFID tag C4W is readable; then the processor 103 determines that the forward direction should be the "north" in light of the data about the control point RFID tag C4W and the location-related data about the unoccupied parking space, and displays the indicated direction (for example, "Turn Left") on the vehicular head-up display. After the left turn, the RFID reader 102 will read the data about the control point RFID tag C3S and send the read data to the processor 103 when the vehicle reaches a location where the control point RFID tag C3S is readable; then the processor 103 determines that the forward direction should be the "east", the distance be "5 meters", the target location be "on the right", and the height be "level 1" in light of the data about the control point RFID tag C3S and the location-related data about the unoccupied parking space, and displays the above-mentioned (for example, "Turn Right", "5 meters", "On the Right", and "Level 1") on the vehicular head-up display. As a result, even if drivers miss the time to follow the instructions given by the system on the forward direction while driving, the system will give instructions on a suggested forward direction for the next crossroads, thus lessening the likelihood that traffic accidents may happen to drivers who miss recommended junctions and thereby get nervous.

Figure 3:
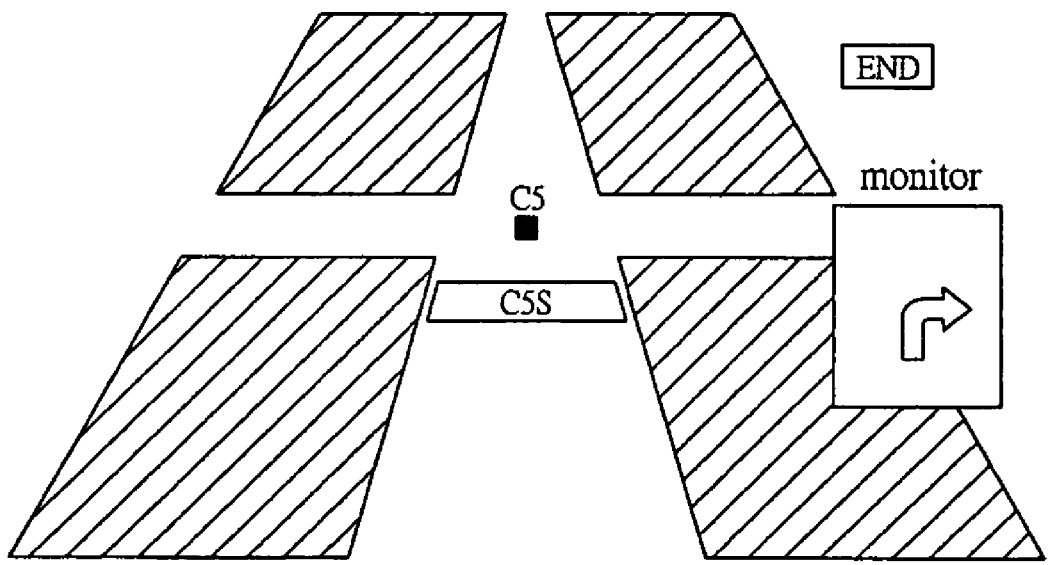
FIG. 3 is a schematic view showing a scenario for how a navigation system according to an embodiment of the present invention is in use.

FIG. 3 is a schematic view showing a scenario for how a navigation system according to an embodiment of the present invention is in use. Referring to the drawing, where a parking lot is deemed the predetermined space to facilitate illustration, once the vehicle reaches a location where the control point RFID tag C5S is readable, the RFID reader 102 will read the data about the control point RFID tag C5S and send the read data to the processor 103; then the processor 103 determines that the forward direction should be the "east" in light of the data about the control point RFID tag C5S and the location-related data about the unoccupied parking space, and displays the indicated direction on the vehicular head-up display. The forward direction may be indicated by simple, easy-to-comprehend arrows and symbols (for example, the "Turn Right" symbol shown in the drawing), thus no complicated display equipment is required. Also, the forward direction may be indicated by sounds so as to reduce visual interference and shorten the identification duration.

Figure 4:
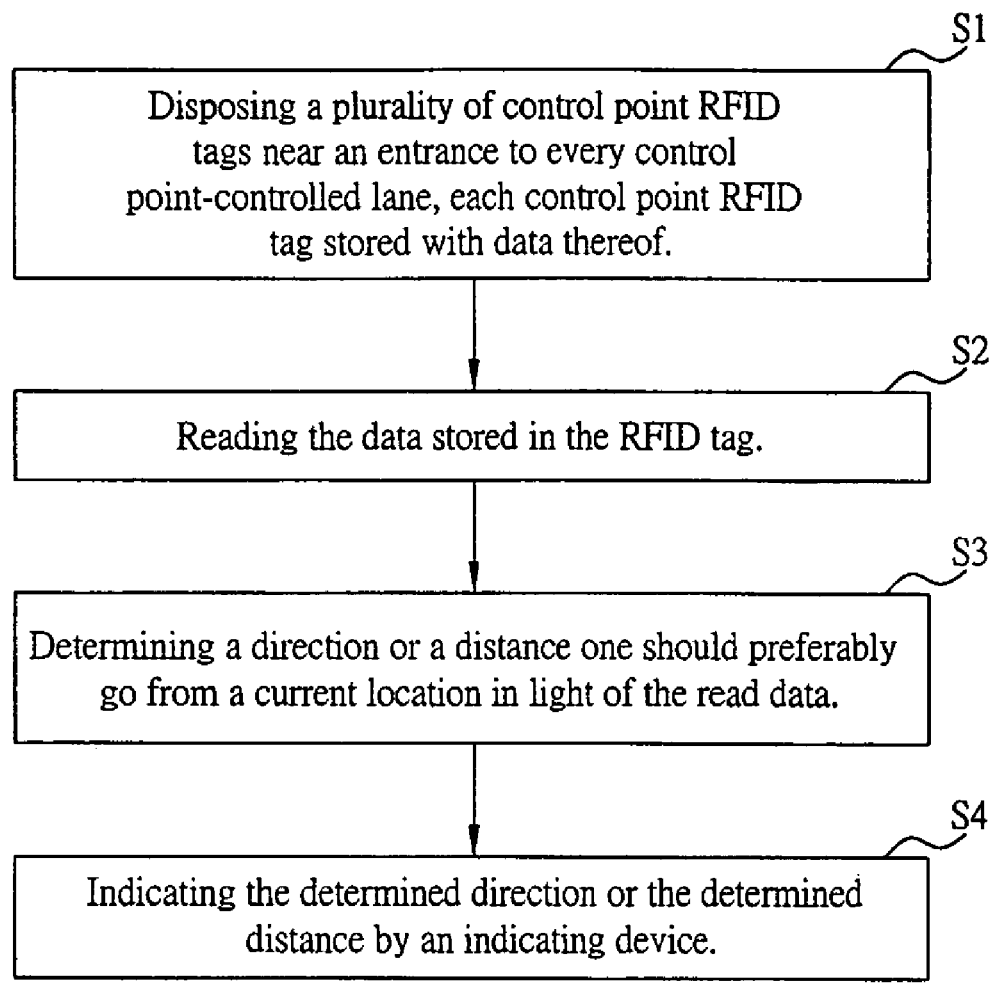
FIG. 4 is a schematic view showing the steps of a navigation method according to an embodiment of the present invention.

FIG. 4 is a schematic view showing the steps of a navigation method according to an embodiment of the present invention. Step S1 involves disposing a plurality of control point RFID tags near an entrance to every control point-controlled lane, each control point RFID tag stored with data thereof. Step S2 involves reading the data stored in the RFID tag. Step S3 involves determining a direction or a distance one should preferably go from a current location in light of the read data. Step S4 involves indicating the determined direction or the determined distance by an indicating device.

As shown above, with the navigation system and method of the present invention, within a predetermined space, an indicating device indicates directions or distances one should go from a current location; the forward direction may be indicated by simple, easy-to-comprehend arrows and symbols, thus no complicated display equipment is required; the forward direction may be indicated by sounds so as to reduce visual interference and shorten the identification duration; and even if drivers miss the time to follow the instructions given by the system on the forward direction while driving, the system will give instructions on a suggested forward direction for the next crossroads, thus lessening the likelihood that traffic accidents may happen to drivers who miss recommended junctions and thereby get nervous. Where a plurality of users are concurrently using the navigation system of the present invention, interference or a user's mis-read of another user's RFID tag rarely occurs, because each RFID tag has its own unique identification code.

The aforesaid embodiment merely serves as the exemplary embodiment of the principles and features of the present invention. The aforesaid embodiment should not be construed as to limit the scope of the present invention in any way. It will be apparent to those skilled in the art that all equivalent modifications or changes made, without departing from the spirit and the technical concepts disclosed by the present invention, should fall within the scope of the appended claims.

What is claimed is:

1. A navigation system for use in a predetermined limited space in which a plurality of control points is defined, the navigation system comprising:
    a plurality of control point RFID tags, each stored with data thereof and disposed near an entrance to control point-controlled lanes in the predetermined limited space;
    a radio frequency identification (RFID) reader for reading the data stored in the control point RFID tags;
    a processor for determining, in light of the data read by the RFID reader, a direction or a distance one should preferably go from a current location to a target location;
    an indicating device for indicating the direction or the distance determined by the processor; and
    at least one target location RFID tag for storing data about the target location,
    wherein each of the control points is one selected from the group consisting of an exit, entrance, crossroads, fork junction, end of a lane, and turn; and the processor judges the moving direction or distance in accordance with the data about the target location as well as the data stored in the control point RFID tags and currently read by the RFID reader;
    wherein the data about the target location is sent to the processor by a source management system in the predetermined limited space via a wireless network; and
    wherein the data about the target location comprise data regarding directions or distances to the target location from the control point-controlled lanes in the predetermined limited space;
    wherein the processor determines; at a moment when one reaches the last control point preceding the target location, at least one selected from the group consisting of: a distance from the control point to the target location, whether the target location is on a left side or a right side in a forward direction, and on which floor the target location lies.

2. The navigation system of claim 1, wherein the predetermined space is one selected from the group consisting of a parking lot, shopping mall, performance venue, exhibition venue, theater, hospital, school, station, plant, commercial building.

3. The navigation system of claim 1, wherein the data stored in the control point RFID tags comprise titles of the control points and orientation of the control point RFID tags in relation to the control points.

4. The navigation system of claim 1, wherein the processor is a processor that belongs to one selected from the group consisting of a PDA, notebook computer, panel computer, cell phone, and vehicular computer.

5. The navigation system of claim 1, wherein the indicating device is a displayer coupled to the processor and configured to display the directions or the distances determined by the processor.

6. The navigation system of claim 5, wherein the displayer indicates the directions determined by the processor with arrows.

7. The navigation system of claim 5, wherein the displayer is a vehicular head-up display.

8. The navigation system of claim 7, wherein the displayer indicates the directions determined by the processor with arrows.

9. The navigation system of claim 1, wherein the indicating device is a sound player coupled to the processor and configured to play sounds indicating the directions or the distances determined by the processor.

10. A navigation method for use in a predetermined limited space in which a plurality of control points is defined, the navigation method comprising the steps of:
    disposing a plurality of control point RFID tags near an entrance to control point-controlled lanes in the predetermined limited space, each control point RFID tag stored with data thereof;
    disposing at least one target location RFID for storing data about a target location; reading the data stored in the control point RFID tag;
    utilizing a processor to determine a direction or a distance one should preferably go from a current location in light of the read data; and
    indicating the determined direction or the determined distance by an indicating device,
    wherein the processor determines a direction or a distance one should preferably go from a current location in light of the data about the target location as well as the data stored in the control point RFID tags and currently read by the RFID reader;
    wherein the data about the target location is sent to the processor by a source management system in the predetermined limited space via a wireless network; and
    wherein the data about the target location comprise data regarding directions or distances to the target location from the control point-controlled lanes in the predetermined limited space;
    wherein the processor determines, at a moment when one reaches the last control point preceding the target location, at least one selected from the group consisting of: a distance from the control point to the target location, whether the target location is on a left side or a right side in a forward direction, and on which level the target location lies.

11. The navigation method of claim 10, wherein the predetermined space is one selected from the group consisting of a parking lot, shopping mall, performance venue, exhibition venue, theater, hospital, school, station, plant, commercial building.

12. The navigation method of claim 10, wherein the data stored in the control point RFID tags comprise titles of the control points and orientation of the control point RFID tags in relation to the control points.

13. The navigation method of claim 10, wherein the processor is a processor that belongs to one selected from the group consisting of a PDA, notebook computer, panel computer, cell phone, and vehicular computer.

14. The navigation method of claim 10, wherein the indicating device is a displayer coupled to the processor and configured to display the directions or the distances determined by the processor.

15. The navigation method of claim 14, wherein displayed on the displayer are arrows indicating the directions determined by the processor.

16. The navigation method of claim 14, wherein the displayer coupled to the processor is a vehicular head-up display.

17. The navigation method of claim 16, wherein displayed on the displayer are arrows indicating the directions determined by the processor.

18. The navigation method of claim 10, wherein the indicating device is a sound player coupled to the processor and configured to play sounds indicating the directions or the distances determined by the processor.

* * * * *